United States Patent Office 2,960,171
Patented Nov. 15, 1960

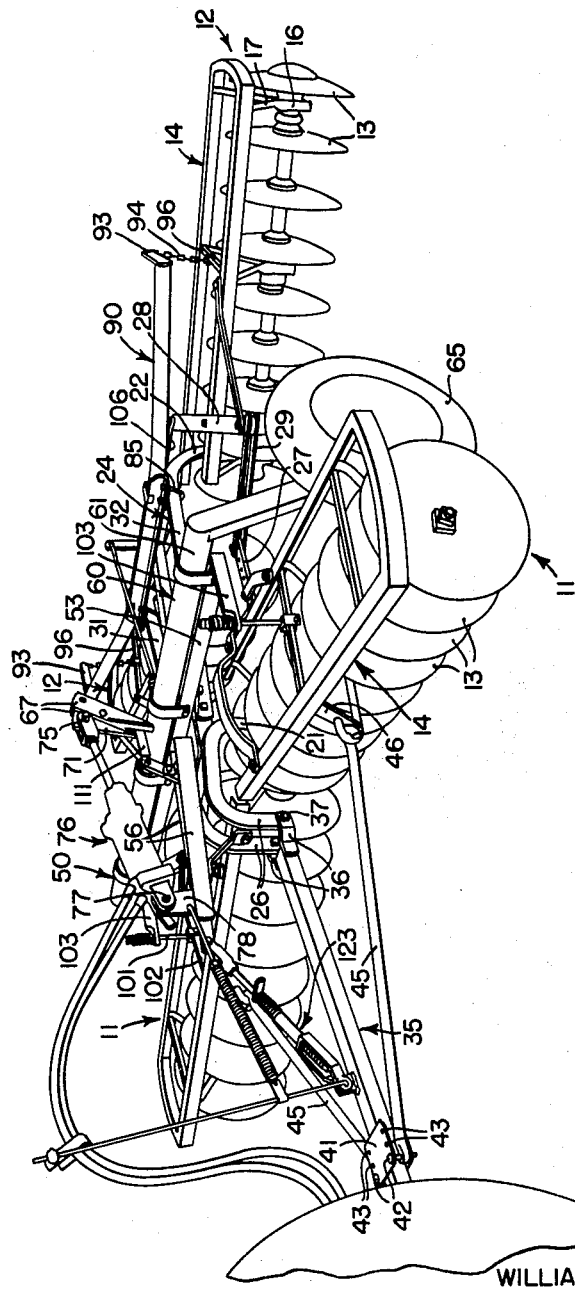

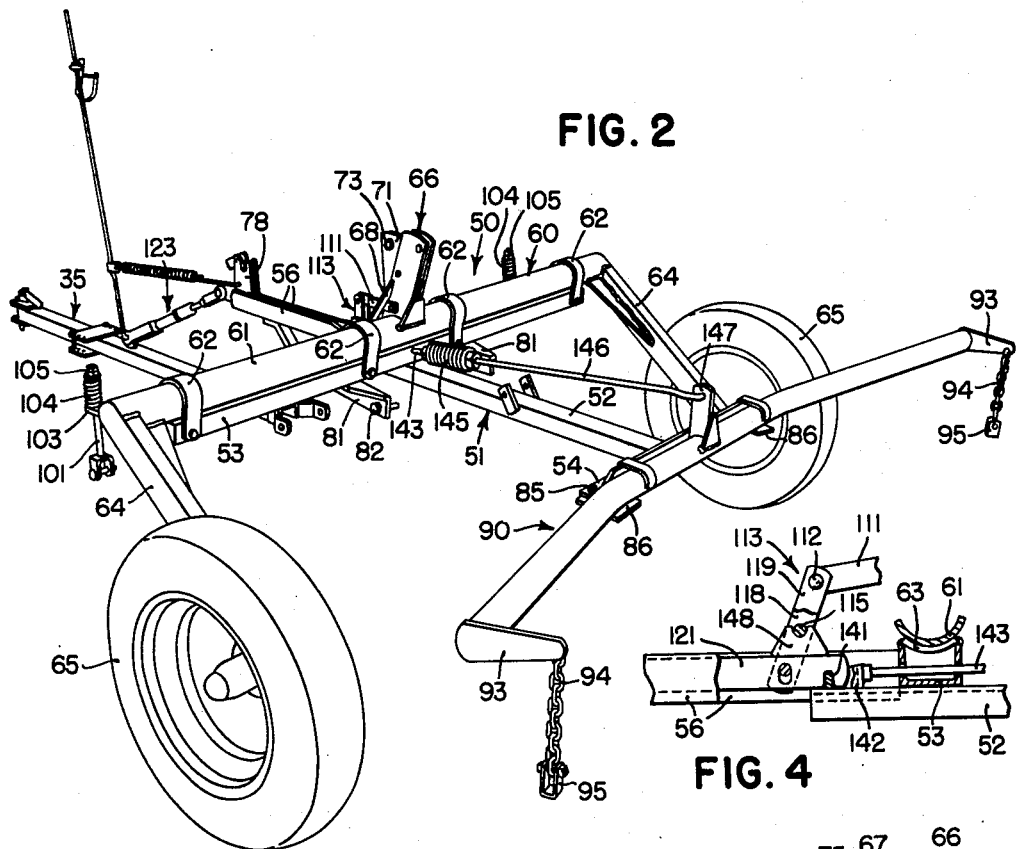

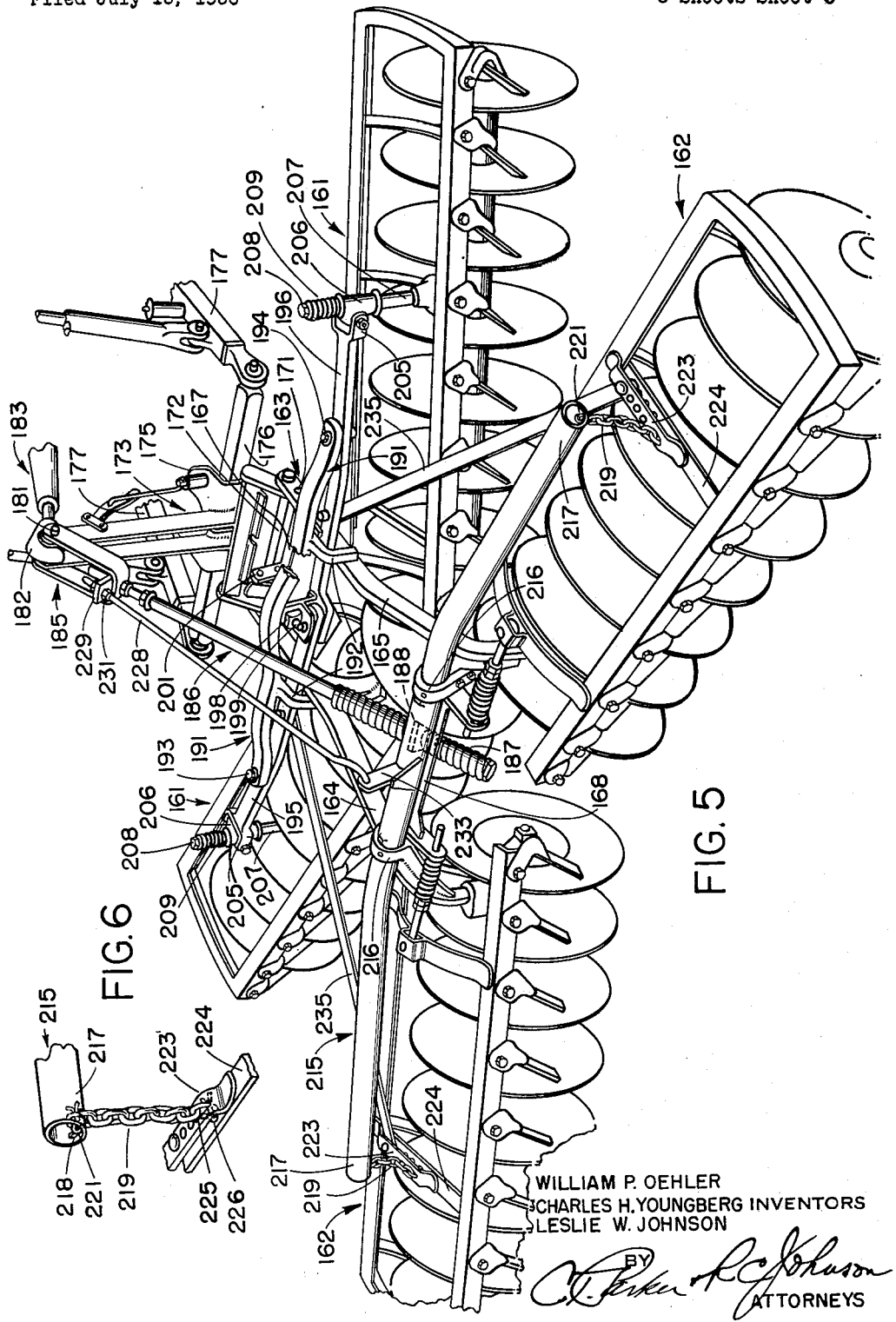

2,960,171

DISK HARROW AND MOUNTING FRAME

William P. Oehler, Charles H. Youngberg, and Leslie W. Johnson, Moline, Ill., assignors, by mesne assignments, to Deere & Company, a corporation of Delaware Filed July 13, 1956, Ser. No. 597,645

14 Claims. (Cl. 172—441)

This is a continuation-in-part of our copending application, Ser. No. 293,612, filed June 14, 1952, for Disk Harrow Including a Wheel Attachment, now U.S. Patent 2,765,609, issued October 6, 1956.

The present invention relates generally to agricultural implements, such as disk harrows and the like, and more particularly to double action tandem harrows that are especially adapted to work a relatively wide strip of ground.

The object and general nature of the present invention is the provision of a disk harrow of the above mentioned type in which provision is made for flexibility, so as to permit uniform action over uneven ground, and for properly sustaining the weight of the outer ends of the gangs, particularly the rear gangs, when the harrow is raised off the ground for transport, either by its own ground wheels or by virtue of being connected with a farm tractor to be lifted by the power lift means thereof.

These and other objects and advantages of the present invention will be apparent to those skilled in the art after a consideration of the following detailed description, taken in conjunction with the accompanying drawings in which:

Figure 1 is a front quartering perspective view showing a disk harrow and a wheel carrier device therefor, in which the principles of the present invention have been incorporated, the implement being shown in its transport position.

Figure 2 is a rear quartering view of the wheel carrier device, with the disk harrow omitted.

Figure 3 is a fragmentary perspective view showing the details of the power-operated raising and lowering connections, with associated parts.

Figure 4 is a fragmentary detail view showing the motion-transmitting connection between the power actuated wheel raising and lowering means and the part that is connected to raise and lower the hitch or drawbar relative to the harrow frame.

Figure 5 is a perspective view of a harrow of the tractor-carried lift type, incorporating the principles of the present invention.

Figure 6 is a detail view of the support for the outer ends of the rear gangs.

Referring now to the drawings, the form of the invention shown by way of illustration in Figures 1–4 is incorporated in a ground-working machine having flexibly interconnected soil-engaging tool means and a wheeled carrier for supporting the soil-engaging elements out of contact with the ground and in a transport position, thereby facilitating moving the machine from place to place, along roads, highways, lanes and the like, or from one field to another as desired without changing the operating position of the soil-engaging elements.

As best shown in Figure 1, the soil-engaging elements may take the form of a pair of front disk gangs 11 and a similar pair of rear disk gangs 12. Each disk gang includes a plurality of disks 13 and a gang frame 14 carried on the disks through suitable bearing means 16 and standard or bearing supports 17, one at the outer end of each of the front and rear gangs, and similar bearing means to which front and rear standards 21 and 22, forming a part of the disk harrow main frame 24, are connected. A disk harrow of this general type is well known, one being disclosed in U.S. Patent 2,339,124, issued January 11, 1944, to Charles H. White, to which reference may be made if necessary. The main frame 24 of the harrow includes a forward section having front depending portions 26, rigid with the front part of the frame 24, to which a drawbar or the like may readily be connected. The inner bearings are so constructed and arranged that each gang may swing in a generally horizontal plane as well as in a generally vertical plane relative to the main frame 24 of the harrow. The front and rear gangs 11 and 12 at each side of the machine are interconnected by front and rear angling arms 27 and 28 and an angling link 29, the gangs 11 and 12 being shown in their angled position in Figure 1. The main frame 24, in addition to the forward drawbar-receiving, laterally spaced apart portions 26, also includes generally rigidly interconnected side frame bars 31 and 32.

According to the principles of the present invention, we provide a vertically swingable drawbar 35 and connect it to the forward frame portions 26 through laterally and rearwardly extending apertured lugs 36 and pivot means 37 connecting the lugs to the frame portions 26, whereby the drawbar 35 may swing vertically relative to the frame 24. The front portion of the drawbar 35 carries an apertured plate 41 and pin or bolt means 42, which latter means may be disposed in any pair of selected openings 43 in the plate 41. The bolt or pin means 42 receive the forward ends of angle-controlling links 45, the rear portions of which are connected for vertical and horizontal swinging to brackets 46 carried by the front gang frames 14. By removing the bolts or pins 42 and disposing them in other openings, the angle of the disk gangs, both front and rear, may be changed as desired, and then by replacing the bolts or pins 42, the gangs are held in their position of adjustment, yet each gang may swing generally vertically about its pivot connection with the associated frame standard 21 or 22.

For supporting the disk gangs 11 and 12 in a position out of contact with the ground, so as to secure easy and convenient transport of the machine, we provide a wheel carrier unit indicated in its entirety by the reference numeral 50. As best shown in Fig. 2, the unit 50 includes a generally centrally disposed main carrier frame 51 that is made up of a longitudinal or fore-and-aft extending inverted channel member 52, a forward transverse frame member 53 which, if desired, may also be in the form of a channel, a rear transverse frame member 54, preferably but not necessarily an angle, both members 53 and 54 being rigidly secured, as by welding, to the fore-and-aft extending frame member 52, and a pair of forward frame bar extensions 56 rigidly connected as by welding, to the flanges at the forward end of the channel 52.

The forward transverse carrier member 53 is carried on a wheel frame 60 which includes a transverse pipe member 61 supported for rocking movement on the frame bar 53 by inverted U-shaped yokes or straps 62 and associated bearing saddles 63 (Fig. 4) welded to the flanges of the transverse channel 53. Secured to the ends of the pipe member 61 is a pair of crank arms 64, the lower ends of which carry spindles on which a pair of ground wheels 65 are mounted for rotation. Centrally, the pipe member 61 has an upwardly extending bracket 66 fixed thereto, as by welding, the bracket 66 preferably consisting of a pair of bars or plates 67 and suitable reenforcing gussets 68. The bars 67 are spaced apart a distance sufficient to receive an arm 71 therebetween, the lower end of the arm being mounted for generally fore-and-aft swinging on a pivot member 72 carried in suitable apertures in the lower portions of the bracket plates 67. The upper end of the arm 71 is provided with a transverse sleeve 73 that is adapted to receive the rear pivot pin 75 of an associated hydraulic ram unit 76. The forward end of the unit 76 carries a pivot pin 77 that is adapted to be releasably connected with a bracket 78 extending upwardly at the forward end of the central frame bar extensions 56. The latter bars are fixed in laterally spaced apart relation by suitable separators or the like.

The carrier frame 51 is connected to the forward portion of the harrow frame 24 by means of a pair of angle brackets 81 secured in any suitable way to the underside of the front transverse channel 53 and having their vertical flanges apertured to receive bolts 82 or the like by which the brackets 81 may be fixed to the forward portion of the harrow frame members 31 and 32, preferably where the front harrow frame section is connected therewith. The rear member 54 of the carrier frame 51 is connected to the rear ends of the harrow frame bars 31 and 32 through a pair of U-bolts 85. The U-bolts 85, the upper ends of which extend through apertures in the horizontal flange of the rear angle member 54, also serve to connect bearing plates 86 to the end portion of the angle 54.

According to the principles of the present invention we provide means to sustain the weight of the outer ends of the gangs, which may be appreciable where the harrow is relatively wide, as shown in Fig. 1, especially the rear gangs. Such means will now be described.

A rear rockable member 90 is arranged transversely of the carrier frame 51 and is supported by the bearing plates 86 for rocking movement about a generally transverse axis. The rear rockable member 90 is bent as best shown in Figure 2 and at its ends carries rearwardly extending arms 93 from which chains 94 depend. The lower ends of the chains 94 are connected by any suitable means, such as clevises 95, with a member 96 that serves as a crossbar for the associated rear gang frame 14. The chains 94 are thus connected to the generally outer end portions of the rear gangs 12.

The outer ends of the front gangs are similarly supported. Specifically, the laterally outer portions of the front gang 11 are flexibly connected with the forward portion of the carrier frame 51 through vertically extending links 101, the lower end of each link or rod 101 being pivotally connected with a cross-bar 102 on the associated gang frame 14, and the upper end of each link or rod 101 is slidably disposed in a bracket 103 carried by and projecting forwardly from the laterally outer end portion of the forward channel 53 of the carrier frame 51. A spring 104 disposed about the upper end of each of the link 101 and an adjustable abutment 105, preferably in the form of a lock nut or the like, is provided at the upper end of each link or rod 101 whereby the spring 104 flexibly or resiliently supports the outer end portion of the associated front gang 11, not only when the wheels 65 are lowered for transport, but also when the machine is in operation, thereby preventing the laterally outer ends of the disk gangs from digging in too deeply. The laterally outer ends of the rear gangs 12 do not tend to dig in; instead, the inner ends tend to dig into the soil. However, they are prevented from doing so by suitable spring means, indicated at 106, the details per se of which do not form a part of the present invention. Both the forward disk-supporting means 101 and the rear disk-supporting means 94 provide for up- and-down movement of the outer ends of the front and rear gangs in operation, whereby the implement may be conveniently constructed to work a relatively wide strip of ground and to follow inequalities in the ground surface, working generally at a uniform depth, therefore, irrespective of whether the ground is level or irregular. Normally, the arms 93 occupy a relatively low position so that the chains 94 are generally slack in operation.

For raising and lowering the ground wheels 65, thereby arranging the implement for ground-working or for transport, respectively, the hydraulic unit 76 is connected with the hydraulic power lift unit of the associated propelling tractor (not shown), which is of conventional construction. Extending and retracting the unit 76 causes the pipe member 61 and arms 64 to be rocked in a direction to raise and lower the wheels 65 relative to the harrow and carrier frames 24 and 51. The rocking movement of the forward transverse member or wheel frame 60 is transmitted to the rear rockable member 90 so that, when the machine is arranged for transport, all slack is taken out of the chains 94 and the rear ends of the arms 93 are lifted a distance sufficient to carry the outer ends of the rear gangs 12 in a substantially level position. So far as the outer ends of the front gangs are concerned, the springs 104, when the harrow is lifted, have sufficient strength to hold the outer ends of the front gangs in a level position. In operation, the outer ends of both the front and the rear gangs are free to rise and fall, as mentioned above.

The rear member 90 is rocked whenever the front member or wheel frame 60 is rocked, as by operation of the power unit 76, by interconnecting or motion-transmitting means which will now be described. Referring first to Figure 3, a link 111 is connected at its rear end with the pivot pin 72 and at its forward end is connected through a pivot pin 112 to the upper end of a lever 113 (Fig. 4). The lever 113 is supported for rocking movement on fulcrum means in the form of a pin 115 and a pair of angle brackets 116 (Fig. 3) supporting the pin 115 on the rear portions of the front bears 56. The lower end of the lever 113, which preferably consists of two bars 118 and 119 mounted in side-by-side relation and apertured at their upper and lower ends, is connected to the rear end of a leveling bar 121 that is supported for sliding movement on the carrier frame in a position between the forward bars 56. The leveling bar 121 extends at its forward end beyond the bracket 78 and is pivotally connected with the front end of the drawbar 35 by a drawbar and leveling adjuster linkage 123. The latter consists of front and rear clevis yokes 125 and 126 and telescopically associated screw-threaded parts 127 and 128, one of which carires a handle 129. The member 127 includes the clevis section 125 and a sleeve portion 131 in which the forward end of the other telescopically associated member 128 is received. A spring 133 is confined between the rear end of the tubular section 131 and the adjusting handle 129, and a similar compression spring 134 is confined between the forward end of the tubular section 131 and a lock nut 136 fixed to the forward end of the member 128. The rear end of the latter member is threaded and adjustably receives the rear swivel yoke 126. Thus, turning the handle section 129 adjusts the effective length of the linkage 123, but in any position of adjustment, the two cushioning springs 133 and 134 provide for relative movement of the linkage parts, whereby the drawbar 35 is adapted to swing vertically through a limited extent even though the leveling bar 121 is held against movement, as by its connection with the wheel frame 60. This permissive movement of the drawbar 35 permits the disk harrow as a whole to tilt on the ground wheels 65 when, in operation with the front end of the drawbar connected to a tractor, an obstruction, such as a stone, hump or the like, is encountered, particularly by the center disks.

The rearmost end of the leveling bar 121 is provided with a notch 141 in which a coupling member 142 is disposed. The coupling member 142 is connected to the front end of a rod 143 that extends through openings in the flanges of the front channel member 53, just above the main channel 52 of the carrier frame. The rear end of the rod 143 is threadedly connected with a coupler 151 connected to the forward end of a cushion spring 145, the rear end of which is connected by a similar coupling member 151 to a rear rod 146, the rear end of which rod is pivotally connected to an arm 147 that is fixed rigidly, as by welding, to the central portion of the rear rockable member 90. The notched end of the leveling bar 121 is maintained in operative connection with the coupler 142 by means of a hold-down bearing block 148 that overlies the rear end of the bar 121 and is notched at its upper side to receive the pivot pin 115, the latter thus holding the member 148 against fore-and-aft displacement. Lock nuts may be provided, if necessary, to maintain the rods 143 and 146 in adjustment relative to the associated coupling members 151.

As best shown in Figure 2, which shows the parts of the wheel carrier for a disk harrow, the carrier frame 51 may readily be connected to the frame 24 of the disk harrow by the forward bolts 82 and the rear U-bolts 85. The drawbar 35 may readily be connected to the front sections 26 of the harrow frame, and then by connecting the angle-controlling rods 45 to the front bearings, both the front gangs and rear gangs are held in the selected position of angle. The lower ends of the lift rods or links 101 are connected with the outer end portions of the front gangs 11 and the rear lift links 94 are connected with the outer end portions of the rear gangs 12 by the clevises 95. By then installing the power lift unit 76, which normally is a part of the propelling tractor, the implement is ready for use.

In operation, by extending the hydraulic unit 76, the wheels 65 may be lowered so as to raise the harrow frame and the associated gangs into their transport position. The clockwise rotation (as viewed in Figure 3) of the pipe member 61 acts through the lever 113 and associated parts to rock the rear transverse member 90 in a counterclockwise direction, thus lifting up through the links 94 on the outer ends of the rear gangs. By thus supporting the outer ends of the rear gangs 12 the main frame 24 is protected against excessive stresses during transport. In a similar way the outer ends of the front gangs 11 are supported by their connections at 101 with the transverse member 53.

In Figure 5 we have shown a lift type harrow having outer end gang support means substantially like that described above. In the lift type harrow, a pair of front gangs 161 and a pair of rear gangs 162 are flexibly connected at their inner ends to a main frame 163, such flexible or articulated connecting means being substantially like that shown in U.S. Patent 2,614,377 issued October 21, 1952, to William P. Oehler. The main frame 163 includes a pair of laterally spaced apart, generally fore-and-aft extending frame bars 164 and 165 suitably interconnected by front and rear crossbars 167 and 168. The ends of the fore-and-aft extending bars 164 and 165 extend forwardly beyond the crossbar 167 and are apertured, as at 171, to receive a cross shaft 172 by which the lower portion of attaching means in the form of a mast or hitch structure 173 is swingably connected with the frame 163. The lower portion of the hitch structure 173 is provided with a forwardly facing socket member 175 that is adapted to receive a crossbar 176 that is connected with the associated tractor (not shown) by the lower laterally spaced apart draft links 177 that form a part of and represent the aforesaid tractor. Thus, the socket member 175 and the crossbar 176 form means at the front of the implement frame 163 to receive the tractor draft links 177. The upper portion of the mast or hitch structure 173 is provided with a cross pin 181 by which the hook member 182 of an upper tractor-carried compression link 183 is connectible with the mast 173. The same pin 181 receives the yoke 185 that forms a part of a compression strut 186, the lower end of which is connected through cushioning springs 187 to a bracket 188 carried by the rear crossbar 168.

Secured to the forward portion of the frame bars 164 and 165 is a crossbar 191, rigidly secured to the frame 163 by U-shaped inverted yokes 192. The crossbar extends laterally outwardly beyond the frame bars 164 and 165 and are apertured to receive pivots 193 and 194 on which are mounted angle-controlling levers 195 and 196, respectively. The inner ends of the levers 195 and 196 are pivotally and loosely connected to a fore-and-aft shiftable yoke 198 whose fore-and-aft position is controlled by a rotatable screw-threaded member 199, the forward portion of which is rotatably anchored to a bracket 201 fixed to the generally central portion of the front crossbar 167. The generally inner end portions of the levers 195 and 196 pass under the yokes 192 and slidably engage the underside portions thereof.

The outer end of each of the levers 195 and 196 carries a bifurcated or yoke section 205 to which a swivel sleeve member 206 is pivotally connected. A vertical standard 207 is slidably disposed in each of the sleeve members 206 and at its upper end carries a stop 208 against which a compression spring 209 bears. The lower end of each of the springs 209 engages against the upper portion of the associated sleeve member 206, and the lower end of each of the standards 207 is connected with the outer bearing member of the associated front gang. Thus, whenever the tractor power lift structure is operated to raise the draft links 177 and associated structure, including the mast section 173, the harrow frame 163 is raised along with the front gangs 161, and the outer ends of the gangs are flexibly or movably supported through the standards 207 and associated springs 209 from the outer ends of the levers 195 and 196.

Somewhat similar means is provided for carrying the outer ends of the rear gangs 162. A rear rockable member 215, which is substantially like the rockable member 90 described above, is supported on the rear portion of the frame 163 by bearing yokes 216, and the outer end portions 217 of the rockable member 215 are bent rearwardly so as to serve as lever arms located back of the axis of rocking of the member 215, as defined by the bearing yokes 216. As best shown in Figure 6, each outer end of the rockable member 215 is provided with a slot 218 in which one link of a chain 219 is disposed, being held in the slot 218 by any suitable means, such as a cotter pin 221 or the like. The lower end of each chain 219 is connected to the associated rear disk gang 162 by means of a bracket 223 carried by or formed on a crossbar 224 that forms a part of the associated gang 162. The bracket 223 has a slot 225 to receive the lower link of the associated chain 219, and a pin 226 or other suitable means holds the lower link of the chain 219 in the bracket 223. Thus, by virtue of the member 215, when the harrow shown in Figure 5 is raised into a transport position, the weight of the outer ends of the gangs are supported principally by the ends of the pipe member 215.

The member 215 may be rocked to different positions by virtue of the generally fore-and-aft extending adjusting link 228 having its forward end screw threaded and extended through an apertured lug 229 carried on the yoke 185, there being lock nuts 231 on the threaded portion of the rod 228 and disposed on opposite sides of the lug 229. The rear end of the adjusting rod 228 is pivotally connected to an arm 233 that is fixed to the generally central portion of the pipe member 215 and extends generally vertically therefrom. By loosening one or the other of the lock nuts 231 and then turning the other, the pipe member 215 may be rocked in the bearing yokes 216 so as to raise or lower the outer ends of the supporting member 215, thus raising or lowering the outer ends of the rear gangs as required.

The working angle of the rear gangs 162 may be adjusted with the front gangs 161 by means of a pair of angling links 235 each connected at its rear and outer end to the associated rear gang crossbar 224, the forward end of each of the angling links 235 being connected to the associated lever, 195 or 196, laterally inwardly of the associated pivots, 193 or 194.

Fig. 5 shows the gangs and other parts in positions they normally occupy during operation. When working the soil, the upper cushioning spring 187 is under some compression, since the action of the soil against the disks is to exert a forward thrust through the upper spring 187 and the strut 186 to the upper end of the mast. This movement of the rear portion of the frame 163 relative to the upper end of the mast 173 has the effect of causing the link 228 to rock the arm 233 rearwardly a relatively small amount, which lowers the outer or crank ends 217 of the rockable member 215, these outer ends serving as lever arms, as described above that, when lowered, serve to provide a certain amount of slack in the chains 219. Thus, within limits, during operation the outer ends of the rear gangs 162 may move upwardly or downwardly, whereby the disk harrow may readily follow irregularities in the ground surface. However, when the implement is raised into a transport position, the removal of the draft forces acting against the disks permits the upper spring 187 to expand, which has the effect of causing the link 228 to pull upwardly against the arm 233, thus raising the lever arm ends 217 of the rockable member 215. This raises the chains 219, takes out all slack, and adequately supports the outer ends of the gangs 162 for transport.

While we have shown and described above the preferred structure in which the principles of the present invention have been incorporated, it is to be understood that our invention is not to be limited to the particular means shown and described above, but that, in fact, widely different means may be employed in the practice of the broader aspects of our invention.

What we claim, therefore, and desire to secure by Letters Patent is:

1. A disk harrow comprising an attaching member, a rigid frame movably connected with said attaching member, right and left hand front and rear disk gangs flexibly connected at their inner ends with said rigid frame, a rear transverse member rockably mounted on said frame and extending laterally beyond said frame, means at the end portions of said transverse member forming lever arms, means connecting said arms to the outer end portions of said rear ganges, and means connected with said attaching member and with said transverse member to rock the latter and thus raise and lower the outer ends of said rear gangs when said rigid frame is moved relative to said attaching member.

2. A disk harrow comprising an attaching member, a rigid frame movably connected with said attaching member, means connected with said frame to raise and lower the latter, right and left hand front and rear disk gangs flexibly connected at their inner ends with said rigid frame, a front bar rigidly connected with the front portion of said frame, means connected therewith to support the outer ends of said front gangs, a rear transverse member rockably mounted on said frame and extending laterally beyond said frame, means at the end portions of said transverse member forming lever arms, means connecting said arms to the outer end portions of said rear gangs, and means connected with said attaching member and with said transverse member to rock the latter and thus raise and lower the outer ends of said rear gangs when said rigid frame is moved relative to said attaching member.

3. A disk harrow comprising an attaching member, a rigid frame movably connected with said attaching member, right and left hand front and rear disk gangs flexibly connected at their inner ends with said rigid frame, a rear transverse member rockably mounted on said frame and having end portions extending laterally beyond said frame and terminating at points spaced generally rearwardly of the axis of rotation of said rockably mounted member, flexible lift elements connecting the outer end portions of said rear gangs with the end portions of said rockable transverse member at said points, and means connected with said attaching member and with said transverse member to rock the latter and thus raise and lower the outer ends of said rear gangs when said rigid frame is moved relative to said attaching member.

4. A disk harrow comprising a generally fore-and-aft extending main frame, front and rear gangs connected with said frame, a hitch device pivotally connected with the forward end of said frame and including an upwardly extending rigid section, an adjustable strut member connected at its upper and forward end to the upper portion of said rigid section, yieldable means connecting the rear and lower end of said strut with the rear portion of said main frame, means to raise and lower said main frame, whereby said strut is movable relative to the rear portion of said main frame whenever said yieldable means yields and means connected with said strut and movable thereby in response to movement of said strut relative to the rear portion of said main frame, and means connected with said movable means for raising and lowering the outer ends of said rear gangs relative to the inner ends thereof.

5. A disk harrow comprising a generally fore-and-aft extending main frame, front and rear gangs connected with said frame, a hitch device pivotally connected with the forward end of said frame and including an upwardly extending rigid section, an adjustable strut member connected at its upper and forward end to the upper portion of said rigid section, yieldable means connecting the rear and lower end of said strut with the rear portion of said main frame, yielding of said yieldable means providing for movement of said strut relative to said main frame, means to raise and lower said main frame, a rear transverse member rockably mounted on said frame and extending laterally beyond said frame, means on the end portions of said transverse member forming lever arms, means connecting said arms to the outer end portions of said rear gangs, and a link connected with said transverse member to rock the same and connected with said strut, whereby movement of said main frame relative to said strut in response to yielding of said yieldable means serves to rock said transverse member.

6. A tractor-carried disk harrow, comprising a main frame, a hitch device pivotally connected with the forward end of said frame and including an upwardly extending rigid section, a strut connected at its upper and forward end to the upper portion of said rigid section, yieldable means connecting the rear and lower end of said strut with the rear portion of said main frame, a pair of inthrow gangs connected at their inner end portions with said frame, a rear transverse member rockably mounted on said frame and extending laterally beyond said frame, means on the end portions of said transverse member forming lever arms, means connecting said arms to the outer end portions of said rear gangs, and a link connected with said transverse member to rock the same and connected with said strut, whereby movement of said main frame relative to said strut serves to rock said transverse member.

7. An agricultural implement comprising a frame, tool means connected with said frame for movement relative thereto, a mast section pivotally connected at its lower end with the forward portion of said frame, means including resilient means connecting the rear portion of said frame with the upper portion of said mast section for yieldably restraining relative movement between said mast section and said frame, means movable with said mast relative to said frame as a consequence of yielding of said resilient means, and means connecting said movable means with said tool means for shifting said tool means relative to said frame in response to movement of said mast relative to said frame.

8. A disk harrow of the tractor-carried type, comprising a frame, a ground working disk gang flexibly connected with said frame for generally vertical movement with respect thereto, a mast section pivotally connected at its lower end with the forward portion of said frame, means including resilient means connecting the rear portion of said frame with the upper portion of said mast section for restraining said pivotal movement, means connected with said gang to shift the latter, and means connecting said last mentioned means with said mast section for shifting said gang in response to said pivotal movement of the mast section relative to said frame.

9. A disk harrow of the tractor-carried type, comprising a frame, a ground working disk gang flexibly connected adjacent one end with said frame for generally vertical movement with respect thereto, means to raise the frame relative to the tractor and including a part shiftable relative to the frame when the frame is raised, supporting means for the other end of said gang movably connected with said frame and connected with said other end to raise the latter relative to said frame-connected end, and means connected with said part and responsive to raising of said frame for shifting said supporting means and raising said other end of said disk gang relative to said one end when said frame is raised.

10. The combination with a tractor having harrow raising and lowering means, of a disk harrow comprising a frame connected for limited movement relative to said raising and lower means, a ground working disk gang flexibly connected adjacent one end portion with said frame for generally vertical movement with respect thereto, a rockable member mounted on said frame and having a lever arm section connected supportingly with the other end portion of said gang, and means connected to act between said rockable member and said raising and lowering means for shifting said rockable member when said frame moves relative to said raising and lowering means.

11. The combination with a tractor having harrow raising and lowering means, of a disk harrow comprising a frame connected for limited movement relative to said raising and lowering means, a pair of ground working disk gangs flexibly connected with said frame for generally vertical movement with respect thereto, a rockable member mounted on said frame and having at each end a lever arm section, means loosely connecting each lever arm section with each gang, and means connected to act between said raising and lowering means and said member for rocking the member to shift said connecting means when said frame moves relative to said raising and lowering means.

12. A disk harrow comprising a generally fore-and-aft extending main frame, front and rear gangs connected with said frame, a hitch device pivotally connected with the forward end of said frame and including an upwardly extending rigid section, a strut member movably connected at its upper and forward end to the upper portion of said rigid section, yieldable means connecting the rear and lower end of said strut with the rear portion of said main frame, whereby yielding of said yieldable means accommodates relative movement between said main frame and said hitch device, a rear transverse member rockably mounted on said frame and having end portions extending laterally beyond said frame, means at the ends of said transverse member forming lever arms, means connecting said arms to the outer end portions of said rear gangs, a part connected with said strut to move therewith relative to said frame, and means connecting said part with said rockable member and responsive to relative movement between said hitch device and said frame for rocking said transverse member.

13. An agricultural implement of the type that is adapted to be connected with a tractor having a three-point hitch, including upper and lower hitch links, and power means connected to raise and lower said links, said implement comprising a frame, means at the front of the frame to receive the rear ends of said hitch links whereby raising and lowering the latter serve to raise and lower said frame, said frame being shiftable relative to the hitch links when raising and lowering of the latter act to raise and lower said frame, spaced apart tool means carried by said frame and one of said tool means being movable relative to the other, a part connected with said hitch and movable with the latter relative to the frame in response to raising and lowering of the frame by the raising and lowering of the hitch, and means connected with said part and said one tool means to shift the latter in response to raising or lowering of said implement frame.

14. The combination with a tractor having harrow raising and lowering means, of a disk harrow comprising a generally central frame connected for limited pivotal movement about a generally transverse axis relative to said raising and lowering means, a pair of generally laterally outwardly extending disk gangs movably connected at their laterally inner ends with said frame for generally vertical swinging relative thereto, a gang shifting member mounted for rocking movement on said frame about a generally transverse axis and including end portions spaced from said axis, means connecting the end portions of said rockable member with the outer ends of said gangs, an arm fixed to the generally central portion of said transverse member and extending generally upwardly therefrom, means including a generally fore and aft shiftable link connected with said arm on said transverse member to rock the latter about said axis, and means connected between said raising and lowering means and the forward portion of said link for shifting the latter in response to movement of said frame about said generally transverse axis.

References Cited in the file of this patent

UNITED STATES PATENTS

| | | |
|---|---|---|
| 2,336,410 | McKay | Dec. 7, 1943 |
| 2,349,257 | Evans | May 23, 1944 |
| 2,458,091 | Moore | Jan. 4, 1949 |
| 2,552,891 | Evans | May 15, 1951 |
| 2,657,511 | Rude | Nov. 3, 1953 |
| 2,694,279 | Nelson et al. | Nov. 16, 1954 |